United States Patent Office 2,966,522
Patented Dec. 27, 1960

2,966,522

SULFURIZATION OF ORTHO-THIOFORMATES

Irving D. Webb, Yorba Linda, Calif., assignor to Union Oil Company of California, Los Angeles, Calif., a corporation of California No Drawing. Filed May 19, 1958, Ser. No. 735,993

9 Claims. (Cl. 260—608)

This invention relates to a process for the sulfurization of certain ortho-thio esters of formic acid and in particular concerns an improved method for combining elemental sulfur with ortho-thioformates to obtain organic products containing a high proportion of chemically bound sulfur.

Organic compounds or products containing relatively large amounts of chemically bound sulfur are widely employed as vulcanization accelerators and in the compounding of extreme pressure lubricants. More recently, certain of such products have been found to be effective fungicides, nematocides and bactericides. One type of such product or compound is that obtained by heating an ortho-thioformate, e.g. methyl orthothioformate with elemental sulfur under such conditions of time and temperature that the sulfur combines chemically with the ortho-thioformate and is not precipitated from the reaction product upon cooling the same to a low temperature. Such mode of preparation, however, is not always satisfactory from the standpoint of inducing large amounts of sulfur to combine with the ortho-thioformate reactant and/or inducing even moderate amounts of sulfur to react at desirably low temperatures and in short reaction times.

I have now found that in reacting ortho-thioformates with elemental sulfur to form products containing increased amounts of chemically combined sulfur, the reaction may advantageously be promoted by carrying it out in the presence of a catalytic amount of a Friedel-Crafts catalyst. The use of such a catalyst in accordance with the invention permits large amounts of sulfur to be readily introduced into the ortho-thioformate molecule at relatively low temperatures and short reaction times.

As stated, the process of the invention is applicable to the sulfurization of certain ortho-thio esters of formic acid. The latter are characterized by the general formula

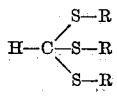

wherein R represents an alkyl radical containing from 1 to about 22 carbon atoms or a mono-nuclear aryl radical. As examples of such compounds to which the process of the invention is applicable, there may be mentioned methyl ortho-thioformate, ethyl ortho-thioformate, isopropyl ortho-thioformate, n-hexyl ortho-thioformate, dodecyl ortho-thioformate, cetyl ortho-thioformate, n-octyl ortho-thioformate, tetradecyl ortho-thioformate, eicosyl ortho-thioformate, phenyl ortho-thioformate, cresyl ortho-thioformate, o-ethylphenyl ortho-thioformate, p-terbutylphenyl ortho-thioformate, p-hexylphenyl ortho-thioformate, dimethylphenyl ortho-thioformate, ditertoctylphenyl ortho-thioformate, trimethylphenyl ortho-thioformate, etc. Mixtures of such ortho-thioformates may also be employed. The catalysts which are employed in accordance with the invention are those metal salts of the group commonly referred to as Friedel-Crafts catalysts, e.g., zinc chloride, ferric bromide, stannic chloride, aluminum chloride, mercuric chloride, boron trifluoride, etc. A zinc halide, particularly zinc chloride, is preferred.

The proportions in which the respective reactants are employed depend upon the identity of the same and upon the degree of sulfurization desired. Certain of the ortho-thioformates, notably the alkyl ortho-thioformates of relatively low molecular weight, readily combine with as many as 15 atoms of sulfur per molecule of the ortho-thioformate, whereas others can be combined, even by the present process, with only about 5 sulfur atoms per molecule. Consequently the reactant proportions may be varied over relatively wide limits, e.g., from as little as about 1 atomic weight to as much as 15 or more atomic weights of sulfur per molecular weight of the ortho-thioformate. Should the ortho-thioformate be one incapable of reacting with all of the sulfur provided, the excess sulfur will deposit out of solution in the reaction product when the latter is cooled (e.g., to about 0° C.) and can readily be removed from the cooled product by filtration. Also, if desired, the sulfur may purposely be employed in excess in order to promote the formation of more highly sulfurized products. The catalyst is of course employed in an amount of sufficient to effect a significant increase in the rate of reaction at a given temperature and/or in the number of sulfur atoms introduced into the ortho-thioformate molecule. Ordinarily, however, between about 0.1 and about 5 parts by weight of the catalyst are provided per 100 parts of the combined weights of the two reactants.

The reaction itself is most readily carried out simply by charging the two reactants and the catalyst to a suitable reaction vessel and thereafter heating the mixture under such conditions of time and temperature that at least one atom of the elemental sulfur combines chemically with each molecule of the ortho-thioformate. As will be apparent, the minimum conditions of time and temperature will be governed by the ease with which the ortho-thioformate reactant combines with the sulfur and/or the number of sulfur atoms which is desired to be introduced into the ortho-thioformate molecule. The maximum conditions are governed by the ease with which the ortho-thioformate reactant and/or the sulfurized product are decomposed. Ordinarily, however, the reaction temperature will be between about 100° C. and about 200° C., and the reaction time will be between about 0.5 and about 12 hours. The reaction pressure is usually atmospheric or the autogenic pressure of the reactants, although higher pressures may be employed if desired. Also, if desired, the reaction may be effected in the presence of an inert liquid reaction medium, e.g., benzene, carbon tetrachloride, carbon disulfide, or the like, in order to promote intimate contact between the two reactants and the catalyst.

Upon completion of the reaction, the reaction product is filtered to separate off the catalyst and any unreacted sulfur. Conveniently, a small sample of the reaction product is cooled to about 0° C. to determine if any unreacted sulfur is contained therein. If such is the case the entire reaction product is cooled to about 0° C. prior to filtering; otherwise, it may advantageously be filtered hot. If the reaction has been carried out in the presence of an inert liquid reaction medium, the latter is removed by distillation or by stripping with an inert gas such as nitrogen. In most instances, the present process, like the prior art non-catalytic processes, produces a more or less complex mixture of individual sulfur-containing compounds. If desired, such mixture may be fractionated, usually under high vacuum, to separate individual or groups of individual compounds. However, for substantially all the known technical uses, such fractionation is unnecessary and in some cases may actually be undesirable; accordingly, the present process will not ordinarily include a step of separating the sulfurization product into individual compounds.

The following examples will illustrate several applications of the principle of the invention, but are not to be construed as limiting the same. All proportions are given in parts by weight.

Example I

A mixture of 100 parts of methyl ortho-thioformate and 42 parts of sulfur is divided into two equal portions. To the second portion there is then added 0.5 part of anhydrous zinc chloride. Both portions are then heated at 145°–155° C. for about 1.25 hours under autogenic pressures, and the reaction products are diluted with an equal volume of acetone and cooled to about 0° C. The reaction product formed in the absence of the zinc chloride deposits about 10 parts of sulfur, whereas only a trace of sulfur precipitates from the product prepared in the presence of the catalyst. Analysis of the catalytically-prepared product shows that about two atoms of chemically bound sulfur have been introduced into the methyl ortho-thioformate molecule.

Example II

The procedure of Example I is repeated, employing ferric bromide, aluminum chloride, and boron trifluoride, respectively, as the catalyst. In all cases, the product prepared in the presence of the catalyst contains appreciably more chemically bound sulfur than the product prepared in the absence of a catalyst.

Example III

One molecular weight of o-cresyl ortho-thioformate is admixed with 8 atomic weights of sulfur and 0.1 molecular weight of zinc bromide. The mixture is dispersed in two volumes of carbon tetrachloride, and the liquid mixture is heated in a closed reaction vessel at 170°–180° C. for 6 hours. The reaction mixture is then cooled to about 0° C., and is filtered to remove the small amount of sulfur which precipitates upon cooling. The filtrate is then fractionally distilled to obtain the sulfurized product as a heavy oil whose analysis shows that an average of 7.8 atoms of sulfur were introduced into the ortho-thioformate molecule. Substantially identical results are obtained when phenyl ortho-thioformate is employed as the ortho-thioformate reactant.

Example IV

A mixture consisting of one molecular weight of propyl ortho-thioformate, five atomic weights of sulfur, and 0.05 molecular weight of anhydrous zinc chloride is heated in a closed vessel at 160°–170° C. for about 2 hours. The reaction product is then stripped with dry nitrogen at 100° C. and 40 mm. pressure to obtain the sulfurized propyl ortho-thioformate product as a yellow oil having an analysis corresponding to the formula $$(C_3H_7S)_3CH \cdot S_5$$

Example V

Example IV is repeated, employing dodecyl ortho-thioformate as the ortho-thioformate reactant. Under the reaction conditions of Example IV, about one-half of the sulfur is chemically bound to the ortho-thioformate molecule. By carrying out the reaction at about 200° C. over a period of 4 hours, substantially all of the sulfur is chemically bound to the ortho-thioformate.

Other modes of applying the principle of my invention may be employed instead of those explained, change being made as regards the methods or materials employed, provided the step or steps stated by any of the following claims, or the equivalent of such stated step or steps, be employed.

I, therefore, particularly point out and distinctly claim as my invention:

1. In a process wherein an ortho-thioformate compound having the general formula

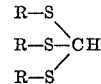

wherein R represents a monovalent substituent selected from the class consisting of alkyl radicals containing from 1 to about 22 carbon atoms and mono-nuclear aryl radicals, is heated with a molal excess of elemental sulfur under conditions of time and temperature such that greater than one atom of said sulfur combines per atom of combined sulfur in said ortho-thioformate compound in such manner that it does not precipitate upon cooling the reaction product to about 0° C., the improvement which consists effecting said heating in the presence of a catalytic amount of a Friedel-Crafts catalyst.

2. A process according to claim 1 wherein the said catalyst is a zinc halide.

3. A process according to claim 1 wherein R represents an alkyl radical.

4. A process according to claim 3 wherein the said catalyst is anhydrous zinc chloride.

5. The process which comprises heating an ortho-thioformate compound having the general formula

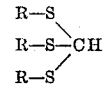

wherein R represents a monovalent substituent selected from the class consisting of alkyl radicals containing from 1 to about 22 carbon atoms and mono-nuclear aryl radicals, with a molal excess of elemental sulfur at a temperature between about 100 C. and about 200 C. for such period of time that greater than one atom of said sulfur per atom of combined sulfur in said ortho-thioformate combines chemically with said ortho-thioformate compound, said heating being carried out in the presence of a catalytic amount of a Friedel-Crafts catalyst.

6. The process of claim 5 wherein the said catalyst is a zinc halide.

7. The process of claim 5 wherein R represents an alkyl radical.

8. The process of claim 5 wherein greater than 1 but less than about 15 atomic weights of sulfur are provided per molecular weight of said ortho-thioformate compound.

9. The process of claim 7 wherein the said catalyst is anhydrous zinc chloride.

References Cited in the file of this patent

Holmberg: Liebig's Annalen 359, 81–99 (1908).
Boeseken: Chemical Abstracts 5, 3399 (1911).
C. A. Thomas: Anhydrous Aluminum Chloride in Organic Chemistry, A.C.S. Monograph, Serial No. 87, page 164 (1941), Reinhold Publ. Co., New York, New York.